J. A. BECHTEL.
METHOD FOR MAKING GLASS MELTING POTS.
APPLICATION FILED MAR. 28, 1917.

1,366,861

Patented Jan. 25, 1921.
4 SHEETS—SHEET 1.

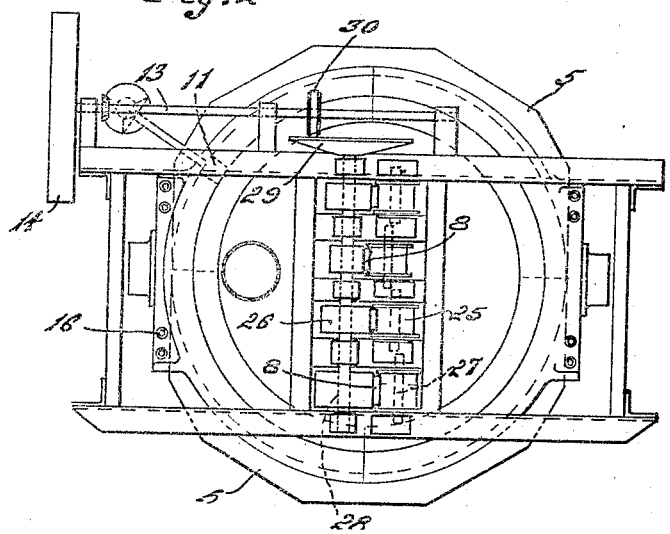

J. A. BECHTEL.
METHOD FOR MAKING GLASS MELTING POTS.
APPLICATION FILED MAR. 28, 1917.

1,366,861.

Patented Jan. 25, 1921.
4 SHEETS—SHEET 3.

WITNESS

INVENTOR.
J. A. Bechtel
ATTORNEYS.

J. A. BECHTEL.
METHOD FOR MAKING GLASS MELTING POTS.
APPLICATION FILED MAR. 28, 1917.

1,366,861.

Patented Jan. 25, 1921.
4 SHEETS—SHEET 4.

UNITED STATES PATENT OFFICE.

JOHN A. BECHTEL, OF TARENTUM, PENNSYLVANIA, ASSIGNOR TO PITTSBURGH PLATE GLASS COMPANY, A CORPORATION OF PENNSYLVANIA.

METHOD FOR MAKING GLASS-MELTING POTS.

1,366,861.

Specification of Letters Patent.    Patented Jan. 25, 1921.

Application filed March 28, 1917. Serial No. 157,976.

*To all whom it may concern:*

Be it known that I, JOHN A. BECHTEL, a citizen of the United States, residing at Tarentum, in the county of Allegheny and State of Pennsylvania, have invented a certain new and useful Method for Making Glass-Melting Pots, of which the following is a specification.

The invention relates to the making of clay pots for use in melting glass. It has for its principal objects; the provision of an improved operation permitting the shrinkage of the clay to prevent cracking during the drying of the clay; the provision of improved procedure for forming, inverting, and coring the mass of clay from which the pot is made; the provision of a method facilitating the removal of the dampest portion of the mass of clay by the coring or cutting out operation; and in general the provision of a simplified and improved method for forming a pot quickly and cheaply, entirely or largely by machine operations. The apparatus for carrying out the invention is illustrated in the accompanying drawings, wherein—

Figure 1:
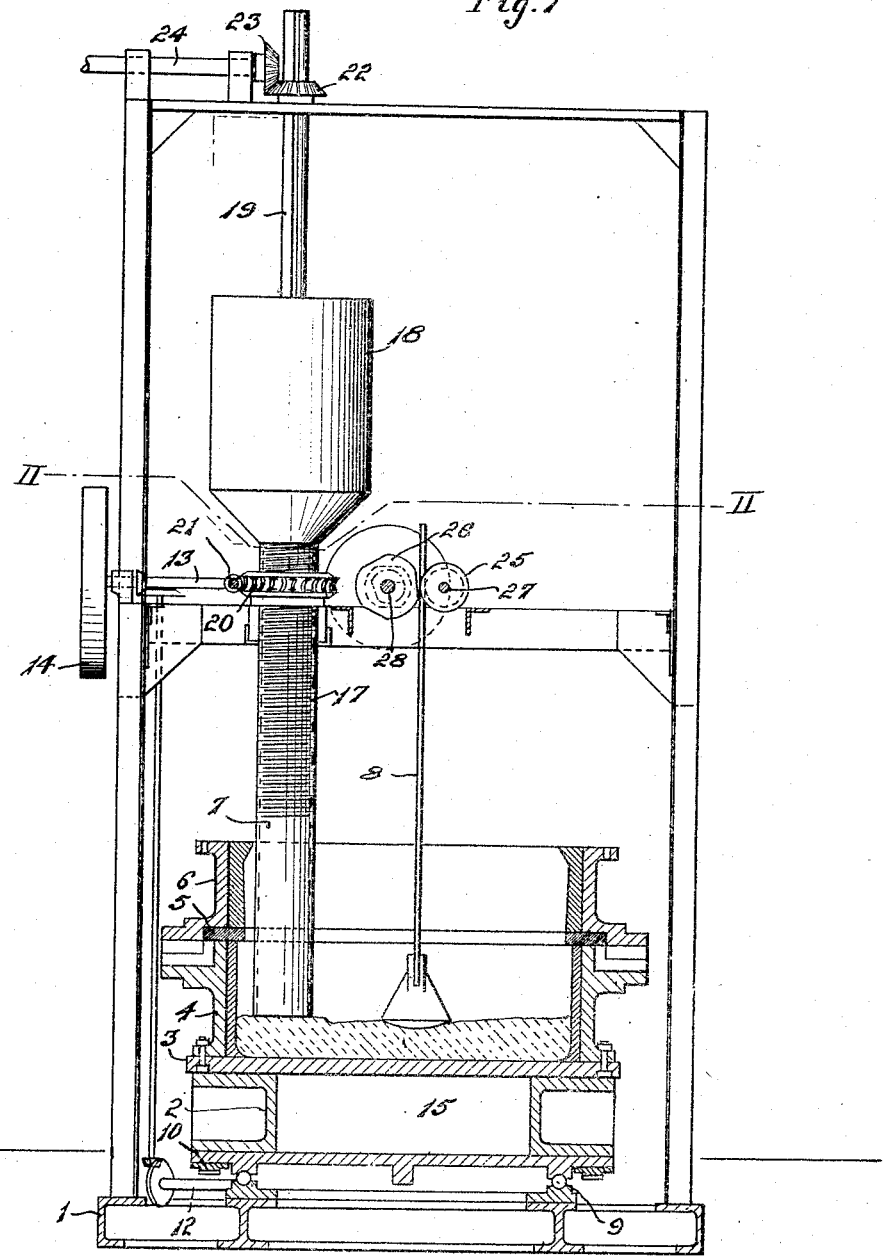
Figure 4:
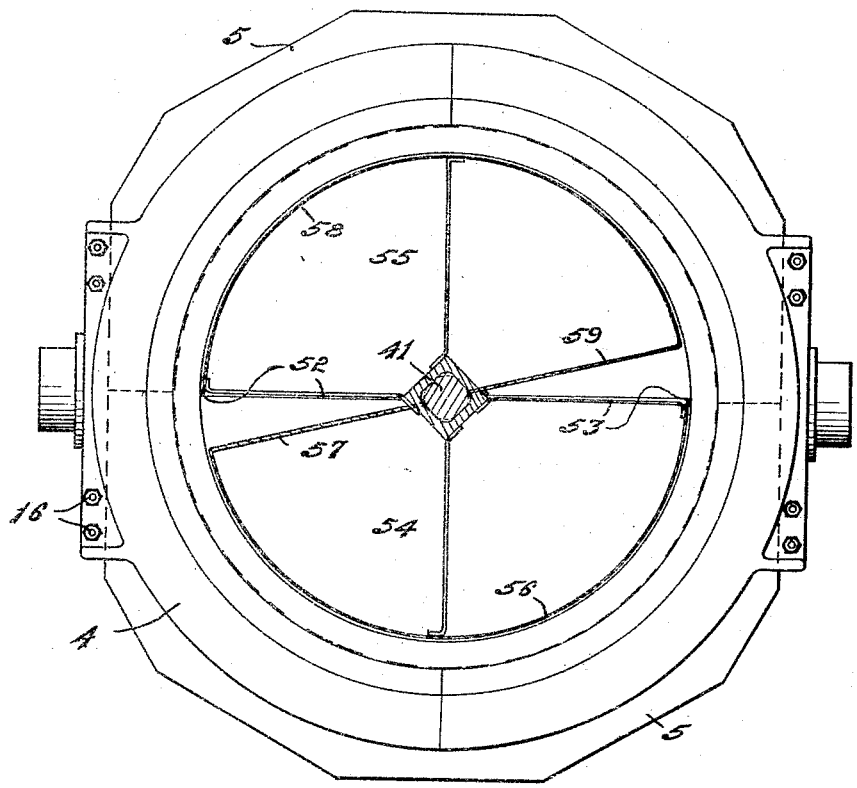
Figure 5:
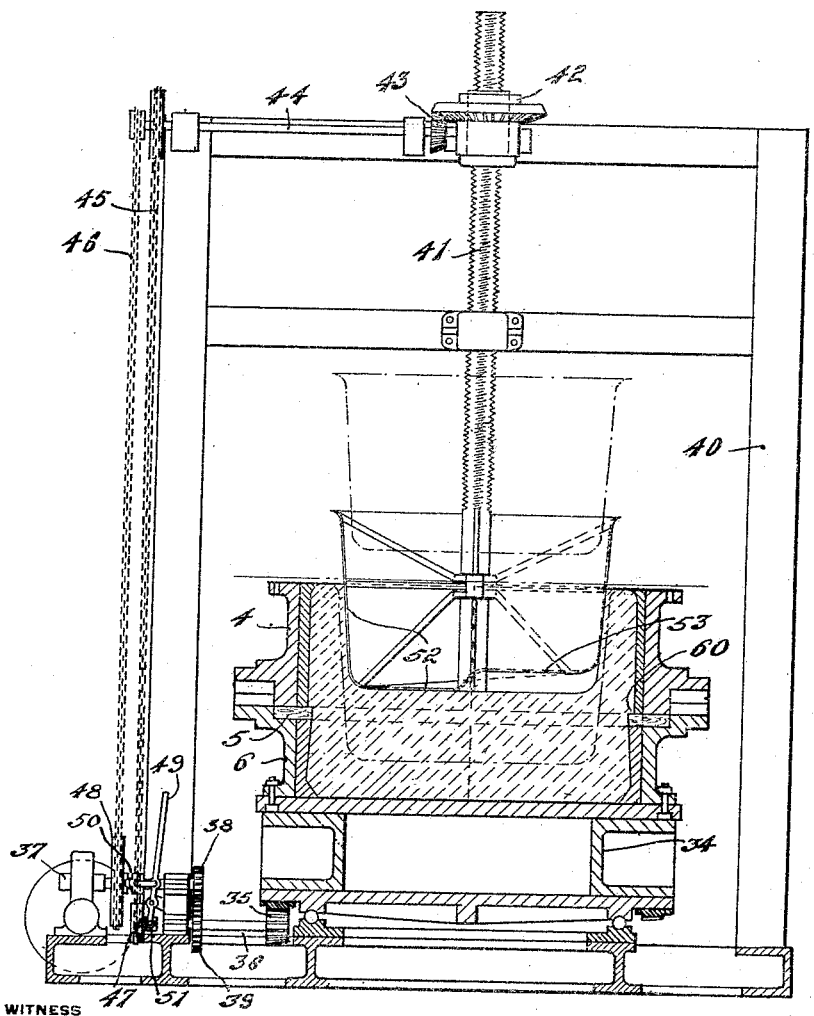

Figure 1 is a side elevation of the apparatus employed in the first part of the operation, such apparatus being shown partially in section and partially in knock-down condition in order to better illustrate the parts; Fig. 2 is a plan view of the apparatus of Fig. 1 with the upper portion of the device broken away on the line II—II of Fig. 1; Fig. 3 is a section through the form employed with the clay therein and in position for inverting; Fig. 4 is a plan view of the apparatus of Fig. 5; and Fig. 5 is a side elevation of the coring out apparatus with the form and pot shown in section.

Referring first to Figs. 1 and 2, which illustrate the method of forming the solid mass of clay preliminary to coring out, 1 is the base of the machine upon which the table 2 is mounted for rotation; 3 is the bottom plate of the form or mold; 4, 5 and 6 are the three sections of the form; 7 is a telescopic tube through which clay is fed to the interior of the form from a pug mill; and 8 is one of a number of tampers employed for compacting the clay in the form.

The table 2 is preferably mounted upon anti-friction balls 9 and is provided with a rack 10 engaged by a gear 11 (Fig. 2), carried on the shaft 12 rotated from the train of connections shown in Fig. 1, and including the main drive shaft 13 with its belt drive or wheel 14. The table 2 is formed with the opening 15 to permit a truck to be wheeled into position to lift the bottom board for transferring the form as hereinafter described.

The sections 4, 5 and 6 are each made in two pieces, as will be seen by reference to Fig. 2. The parts 4 and 6 are clamped together by means of the vertical bolts 16 (Fig. 4), such bolts extending through horizontal flanges on the parts 4 and 6. This arrangement permits the form to be taken apart to free it from the clay as hereinafter set forth. The clay is supplied through the tube 7 which is screw-threaded as indicated at 17, and carries at its upper end the casing 18 of the pug mill. Working in the casing 18 is a screw for feeding the clay downward, such screw being mounted upon the shaft 19.

It is desirable to have the clay supplied as low as possible in the form to prevent air from being caught by the falling clay, as would be the case if the lower end of the tube were a considerable distance above the level to which the clay was being supplied, so that feeding means are provided for moving the tube upward gradually as the form below is filled. This feeding means includes the nut 20 which has its outer surface provided with a worm wheel driven from a worm on the shaft 21, such shaft being operated from a drive independent of the main drive shaft 13, and not shown. The shaft 19 is preferably splined in the bevel gear 22 engaging a second gear 23 driven from a drive shaft 24.

The tampers 8 are arranged in a series extending across the interior of the mold and are operated by sets of wheels 25, 26, carried by shafts 27, 28, and the wheels 25 are grooved. The wheels 26 are provided with a plurality of gripping sections (three as illustrated) and a plurality of intermediate spaces so that for each revolution of the wheels 28 the tampers are lifted and allowed to drop three times. The number of lifts and drops can be arranged to meet requirements, and the tampers nearest the center of the mold may be made with a less number of lifting means that the outer ones since the area to be compacted by the tampers is less than that to be compacted by the outer tampers. For this same reason the outer tampers may be made heavier than the inner ones.

The shaft 28 is operated from the friction drive 29, 30 (Fig. 2), the latter wheel being mounted upon the main drive shaft 13. This arrangement of tampers permits the tampers to work up gradually as the depth of clay in the form becomes greater, so that the position of the tampers is automatically regulated.

The filling and tamping operation is continued until the form is entirely filled, after which a truck 31 (Fig. 3) is wheeled beneath the bottom plate 3 and a top plate 32 is applied, (Fig. 3) the parts being secured together by means of the bolts 33.

The parts are allowed to remain in this position for a considerable length of time, twenty-four hours or more, after which the mold is inverted and cored out upon the apparatus shown in Fig. 5. This feature involving the inverting of the apparatus is advantageous since the excess of moisture in the clay drains to the lower portion when the mass of clay is in the position of Fig. 3, so that when the form is inverted and cored out, the dampest clay is removed. This operation renders the drying of the pot less tedious.

The coring out apparatus, shown in Figs. 4 and 5, comprises a table 34 mounted for rotation as in the construction of Fig. 1, and having means for rotating it corresponding to those of Fig. 1, and including a gear 35 mounted on the shaft 36, such shaft being driven from the drive shaft 37 by means of the gears 38 and 39. The coring out mechanism is carried by the framework 40 provided with the shaft 41, such shaft being threaded through the operating nut 42. The operating nut is driven from the gear 43 carried upon the shaft 34, which shaft may be driven at two speeds by means of the sprocket chains 45 and 46. These sprocket chains are driven from the sprocket wheels 47 and 48 either of which may be thrown into operation by the lever 49 operating the clutch members 50 and 51.

During the coring out operation, the blades must be fed downward gradually, and at this time, the feed nut 42 is driven from the sprocket chain 45, the sprocket wheel 48 at such time being out of driving engagement. After the coring out operation has been accomplished and it is desired to withdraw the cutting mechanism rapidly the clutch for the sprocket wheel 51 is disconnected while the clutch for the sprocket wheel 48 is connected, thus providing a drive which will rapidly rotate the nut 42 to secure the withdrawal of the cutting mechanism in a minimum amount of time.

The shaft 41 is preferably provided at its lower end with a pair of cutting blades 52 and 53, one cutting edge being arranged slightly below the other, and constituting the forward edges of the bottom members 54 and 55 (Fig. 4). The bottom cutting edges curve at their outer portions and extend upward as indicated in Fig. 5, so that they serve to cut the sides of the form as well as the top. Extending upward from these bottom members are side walls 56, 57, 58 and 59. Two cup shaped members are thus provided open on the sides carrying the cutting blades, the cup member having the cutting edge 53 being provided with the vertical walls 56 and 57, while the cup member having the cutting edge 52 on its bottom, is provided with the vertical walls 58 and 59.

As the cutting device is rotated the clay in the mold is shaved off by the two blades 52 and 53, and this material which is shaved off slides back into the two cup members gradually filling such cup members as the cutting progresses. The two cup members will hold substantially all the clay which is cut out in the coring operation, but in case the quantity of clay thus collected fills in to such an extent, or in such way, as to interfere with the cutting operation, the clay may be shoveled or scooped from the cup members at any desired interval, or any desired means for removing the clay may be employed. This is easily done since the shaft 41 and the cup members carried thereby have no movement of rotation, the cutting operation being accomplished by reason of the rotation of the table 34 and the form carried thereby.

In order to permit of the shrinkage of the pot during the drying operation, so that the pot will not crack, the thin section 5 of the form is made removable. This section like the other sections of the form, is made in two pieces, and these sections (Fig. 2) extend for the greater part of their length out past the edges of the mold sections 4 and 6 so that these sections of the member 5 may be engaged and pulled out horizontally. Removal of the two sections of the member 5 leaves the ledge 60 (Fig. 5) and the upper and lower halves of the pot free to move vertically as the pot shrinks in the drying operation. The member 5 is preferably removed after the coring out operation, and while the pot is still further drying and setting in the sections 4 and 6, but if desired this member 5 might be removed before the coring out operation. In some cases it may be desirable to mold the outside of the pot to a size greater than its intended finished size or of a different contour, and then cut away the outside to bring the pot to its desired shape and contour, and it will be understood that the invention is not limited to forming the pot in the mold to the exact proportions of the finished pot, and that the term "contour" as applied in the claims to the formation of the exterior of the pot, does not necessarily mean the contour of the finished pot, but rather of the blank which may or may not be subsequently altered by cutting.

What I claim is:

1. The method of making clay pots which consists in compacting the clay in a solid mass in a form having the contour of the exterior of the pot to be formed, allowing the mass to remain in the form a predetermined period, inverting the mass, cutting out the central portion of the inverted mass to form the interior of the pot, and removing the form.

2. The method of forming clay pots which consists in compacting the clay in a form having the contour of the exterior of the pot to be formed and comprising a plurality of vertical sections, and during the drying operation removing a section of the form between the top and bottom of the form to permit of shrinkage of the clay.

3. The method of forming clay pots which consists in compacting the clay in a form having the contour of the exterior of the pot to be formed and comprising a plurality of vertical sections, coring out the central portion of the mass of clay to form the interior of the pot, and then removing a section of the form intermediate the top and bottom sections thereof to permit the pot to shrink during the drying operation and with the top and bottom sections in position.

JOHN A. BECHTEL.